United States Patent
Nakamura

(10) Patent No.: US 8,125,860 B2
(45) Date of Patent: Feb. 28, 2012

(54) OPTICAL DISK PLAYBACK DEVICE

(75) Inventor: Yoshitaka Nakamura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 443 days.

(21) Appl. No.: 12/302,001

(22) PCT Filed: Apr. 12, 2007

(86) PCT No.: PCT/JP2007/058094
§ 371 (c)(1),
(2), (4) Date: Nov. 21, 2008

(87) PCT Pub. No.: WO2008/018209
PCT Pub. Date: Feb. 14, 2008

(65) Prior Publication Data
US 2010/0195451 A1 Aug. 5, 2010

(30) Foreign Application Priority Data
Aug. 9, 2006 (JP) .................................. 2006-217108

(51) Int. Cl.
*G11B 21/08* (2006.01)
(52) U.S. Cl. .................................... 369/30.1; 369/44.28
(58) Field of Classification Search ...... 369/30.1–30.17, 369/44.28, 44.27, 44.29, 44.35
See application file for complete search history.

(56) References Cited

U.S. PATENT DOCUMENTS

| 5,420,839 A * | 5/1995 | Tateishi ...................... 369/30.25 |
| 5,583,835 A | 12/1996 | Shimosaka |
| 6,560,170 B2 * | 5/2003 | Hirose ........................ 369/30.04 |
| 6,928,037 B1 | 8/2005 | Maier et al. |
| 2009/0201778 A1 * | 8/2009 | Nakamura ................. 369/47.15 |

FOREIGN PATENT DOCUMENTS

| CN | 1540657 A | 10/2004 |
| JP | 5-60191 B2 | 9/1993 |
| JP | 3012596 U | 4/1995 |
| JP | 8-161868 A | 6/1996 |
| JP | 9-270186 A | 10/1997 |
| JP | 2743848 B2 | 2/1998 |
| JP | 2001-517852 | 10/2001 |
| JP | 2002-237032 A | 8/2002 |
| JP | 2002-237172 A | 8/2002 |
| JP | 2003-272348 A | 9/2003 |

* cited by examiner

*Primary Examiner* — Tan X Dinh
(74) *Attorney, Agent, or Firm* — Birch, Stewart, Kolasch & Birch, LLP

(57) ABSTRACT

An optical disk playback device includes a first control means for holding difference information which the first control means generates by, during playback of an optical disk 10, performing a comparison between track start point position information detected and track start point position information acquired with reference to contents information recorded in the above-mentioned optical disk, and a second control means for, when receiving a search request from outside the device, correcting the above-mentioned track start point position information on the basis of the above-mentioned held difference information.

4 Claims, 6 Drawing Sheets

OPTICAL DISK PLAYBACK DEVICE

FIELD OF THE INVENTION

The present invention relates to an optical disk playback device which performs movement control of an optical pickup by using contents information recorded in a TOC (Table Of Contents) of, for example, a compact disk or the like.

BACKGROUND OF THE INVENTION

An optical disk playback device for playing back an optical disk, such as a CD-ROM, reads contents information recorded in a TOC area on the optical disk, and reads information about music, an image, or the like recorded in a program area on the basis of the contents information to play back the information. Such an optical disk playback device performs the same operation on a write-once type optical disk, such as a CD-R, and a re-recordable optical disk, such as a CD-RW.

By the way, a problem occurring in a mastering process for commercial disks, a problem occurring when the user writes data into a writable type disk, an error occurring at a time of TOC reading, or the like may cause a difference between the contents information read by a drive (a control microcomputer) and the address of the actually-acquired program area. In this case, there arises a problem that when performing a search for a track start point on the basis of the contents information of the TOC, a track position which is different from the actual one is searched for and, for example, a playback is started from some midpoint of a musical piece or a flickering screen display is produced.

There is known a technology of, in order to solve this problem, judging whether playback equipment has succeeded or failed in reading out the contents information of an optical disk on the basis of the length of time required to read out the contents information (for example, refer to patent reference 1).

[Patent reference 1] JP,2003-272348,A

According to the technology disclosed by the above-mentioned patent reference 1, because correct contents information can be acquired from the TOC of an optical disk before the playback equipment starts a playback of data, the playback equipment can be prevented from being unable to play back the data due to incorrect contents information.

However, because the playback equipment repeats a process of acquiring the contents information until it can acquire the correct contents information from the optical disk, even if the reliability of the data playback of the optical disk can be improved, there may be a case in which the playback equipment falls into a loop and cannot terminate normally depending on the cause of an occurring error, and therefore cannot play back the data.

The present invention is made in order to solve the above-mentioned problems, and it is therefore an object of the present invention to provide an optical disk playback device which, when detecting a track start point position during playback of an optical disk, compares the contents information recorded in the optical disk with an actual track start point position so as to calculate and hold an error between the contents information and the actual track start point position, thereby being able to perform a track search correctly and promptly without affecting the playback.

DISCLOSURE OF THE INVENTION

In accordance with the present invention, there is provided an optical disk playback device including: a first control means for holding difference information which the first control means generates by, during playback of an optical disk, performing a comparison between track start point position information detected and track start point position information acquired with reference to contents information recorded in the optical disk; and a second control means for, when receiving a search request from outside the device, correcting the track start point position information on a basis of the held difference information.

In accordance with the present invention, there is provided an optical disk playback device including: an optical pickup means for reading information recorded in an optical disk and for outputting a signal according to the information; a signal processing means for decoding the signal to output the decoded signal to a playback system, and for extracting a subcode from the signal to output time information; a control means for holding time difference information which the control means generates by, during playback of an optical disk, performing a comparison between track start point position information analyzed with the subcode and track start point position information acquired with reference to contents information recorded in the optical disk, and for correcting the track start point position information on a basis of the held time difference information when performing a track search; and a servo control means for carrying out movement control of the optical pickup means on a basis of the corrected track start point position information.

When detecting a track start point position during playback of the optical disk, the optical disk playback device in accordance with the present invention can perform a track search correctly and promptly without affecting the playback by comparing the contents information recorded in the optical disk with an actual track start point position to calculate and hold an error between them.

PREFERRED EMBODIMENTS OF THE INVENTION

Hereafter, in order to explain this invention in greater detail, the preferred embodiments of the present invention will be described with reference to the accompanying drawings.

Embodiment 1

Figure 1:
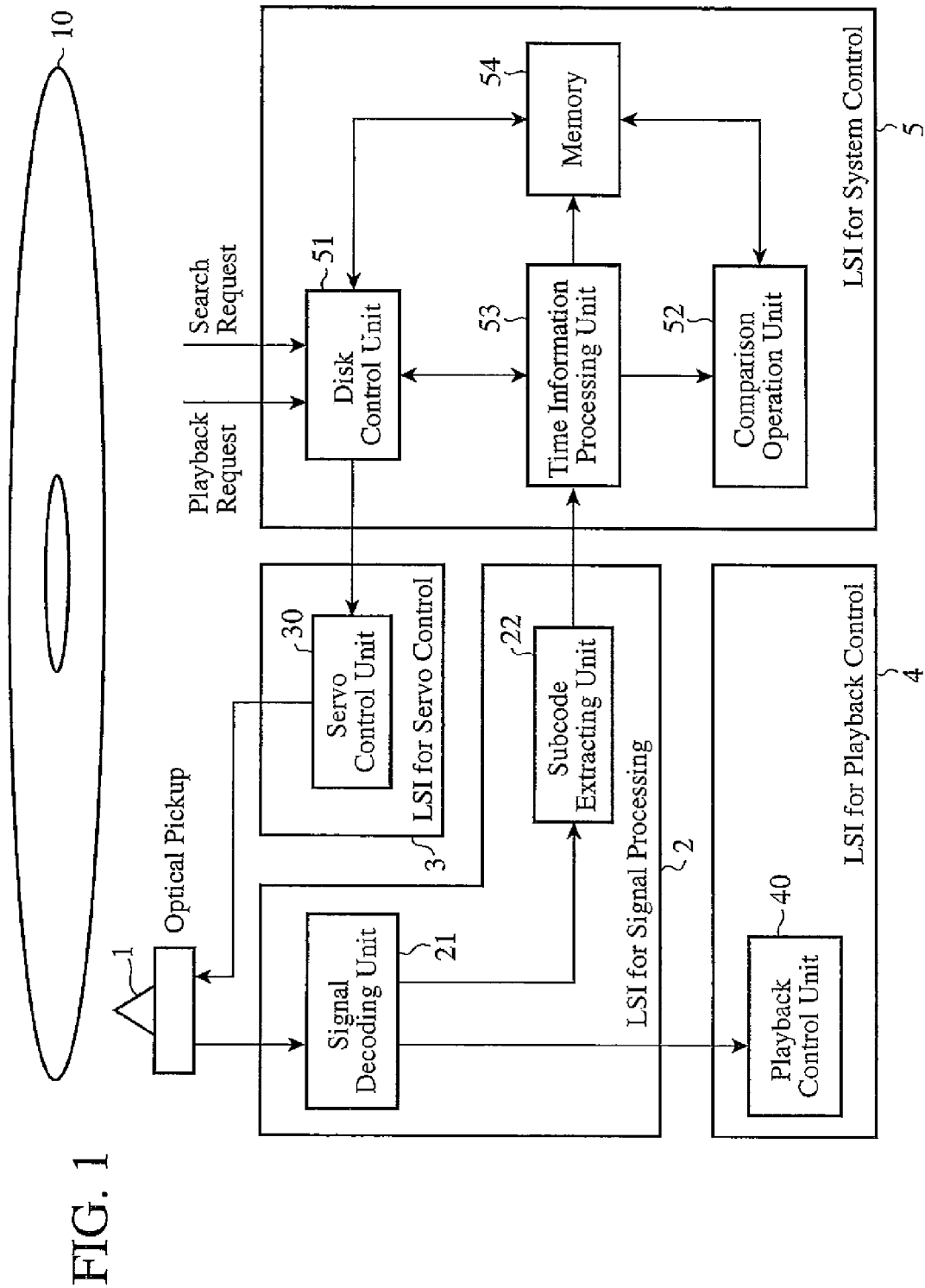
FIG. 1 is a block diagram showing the internal structure of an optical disk playback device in accordance with Embodiment 1 of the present invention.

FIG. 1 is a block diagram showing the internal structure of an optical disk playback device in accordance with Embodiment 1 of the present invention.

In this embodiment, the optical disk playback device is comprised of an optical pickup 1, an LSI 2 for signal processing, an LSI 3 for servo control, an LSI 4 for playback control, and an LSI 5 for system control.

The optical pickup 1 operates as an optical pickup means for reading information recorded in an optical disk 10, and outputting a signal (an RF signal) according to this information to the LSI 2 for signal processing. The LSI 2 for signal processing operates as a signal processing means for decoding the RF signal outputted from the optical pickup 1 and then outputting the decoded RF signal to the LSI 4 for playback control, and for extracting a subcode from the RF signal and then outputting time information to the LSI 5 for system control.

To this end, the LSI 2 for signal processing is comprised of a signal decoding unit 21 and a subcode extracting unit 22.

The LSI 3 for servo control operates as a servo control means for performing movement control of the optical pickup 2 on the basis of corrected track start point position information. Concretely, the LSI for servo control includes a servo control unit 30 for performing control for tracking and focusing.

The LSI 4 for playback control includes a playback control unit 40 which is disposed as a playback system for converting the RF signal decoded by the LSI 2 for signal processing into a digital signal, and for carrying out a medium playback (e.g., an audio playback).

The LSI 5 for system control functions as a first control means for holding time difference information which the first control means generates by, during playback of the optical disk 10, performing a comparison between track start point position information analyzed with the subcode outputted from the LSI 2 for signal processing and track start point position information acquired with reference to the contents information recorded in the TOC area of the optical disk 10, and a second control means for, when receiving a search request from outside the device, correcting the track start point position information on the basis of the time difference information held by the first control means.

Therefore, the LSI 5 for system control is comprised of a disk control unit 51, a comparison operation unit 52, a time information processing unit 53, and a memory 54.

The disk control unit 51 receives a search request from outside the device and performs movement control of the optical pickup 1 via the LSI 3 for servo control. It is assumed that the search request is generated when a user manipulates a switch not shown in the figure.

The comparison operation unit 52 operates as the first control means for holding the time difference information which the comparison operation unit generates on the basis of the time information extracted and outputted by the LSI 2 for signal processing by, during playback of the optical disk 10, performing the comparison between the track start point position information analyzed and the track start point position information acquired with reference to the contents information recorded in the memory 54 in the memory 54. Furthermore, the time information processing unit 53 operates as the second control means for correcting the track start point position information on the basis of the time difference information held by the memory 54 when receiving the search request so as to control the disk control unit 51.

Figure 2:
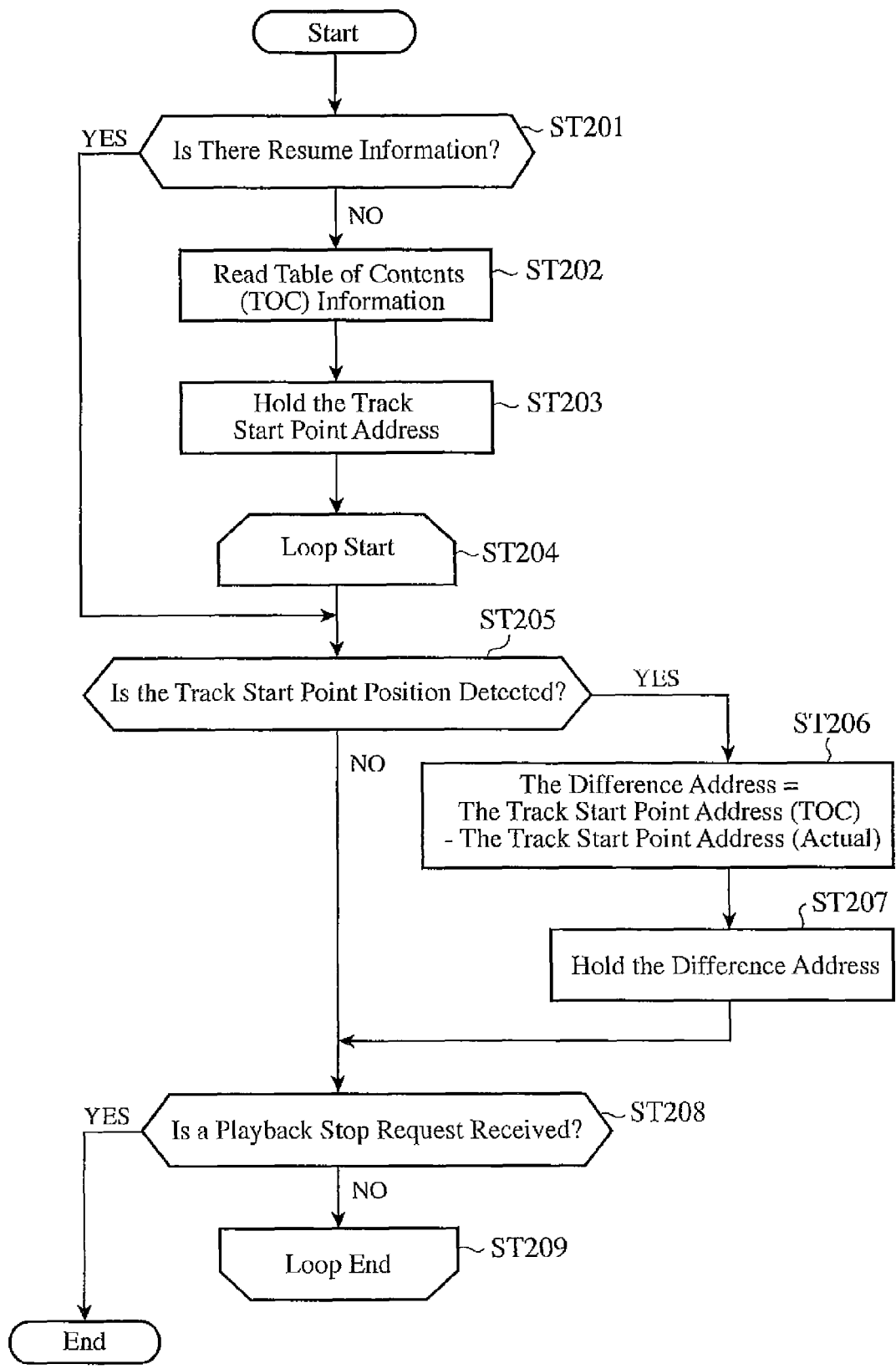
FIG. 2 is a flow chart which is referred to in order to explain the operation of the optical disk playback device in accordance with Embodiment 1 of the present invention.
Figure 3:
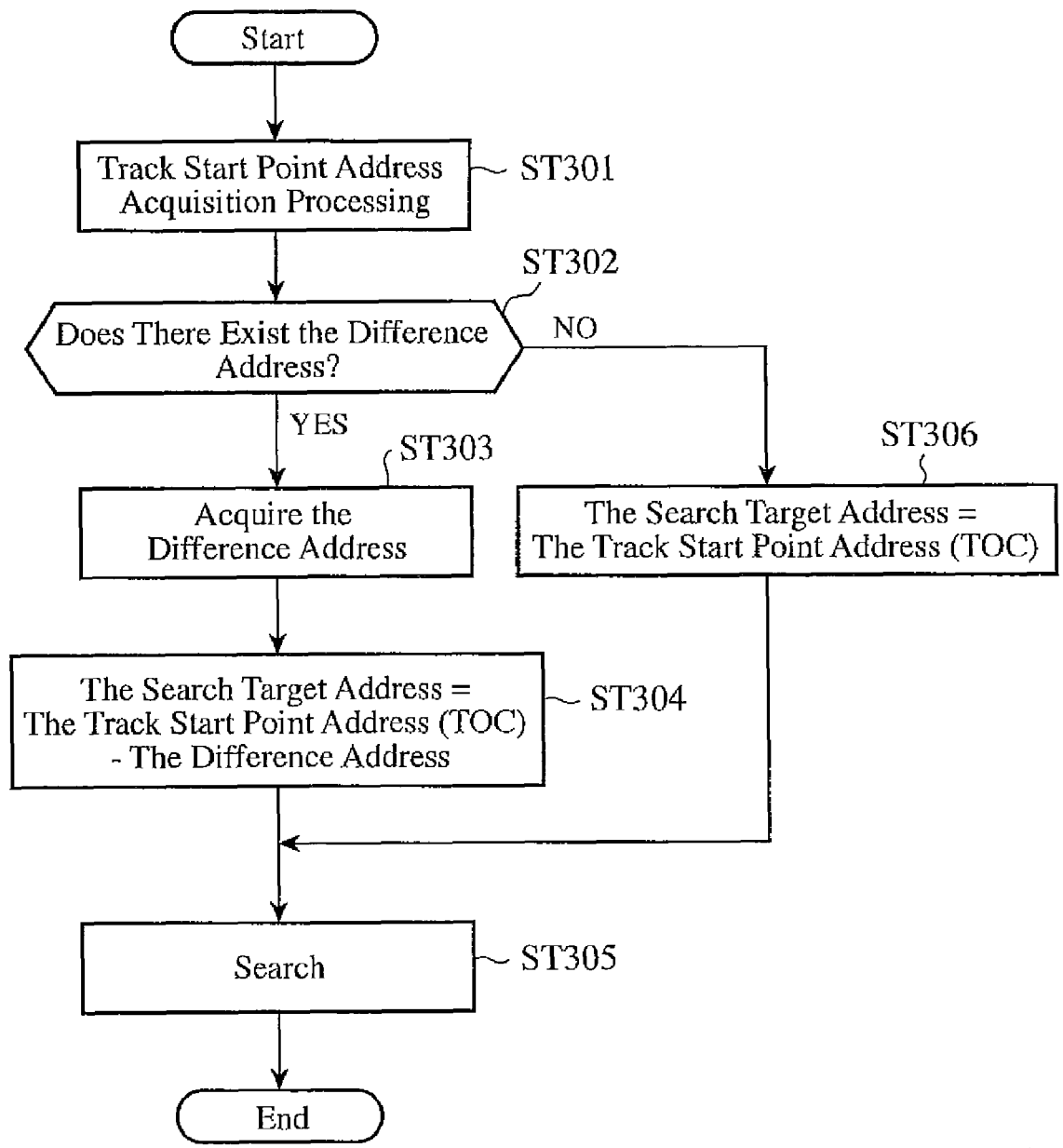
FIG. 3 is a flow chart which is referred to in order to explain the operation of the optical disk playback device in accordance with Embodiment 1 of the present invention.

FIGS. 2 and 3 are flow charts which are referred to in order to explain the operation of the optical disk playback device in accordance with Embodiment 1 of the present invention. FIG. 2 shows a playback process, and FIG. 3 shows a search process.

Hereafter, the operation of the optical disk playback device in accordance with Embodiment 1 shown in FIG. 1 will be explained in detail with reference to the flow charts of FIGS. 2 and 3.

In FIG. 2, the LSI 5 for system control checks whether or not there exists resume information in response to a playback request from outside the device first (step ST201). In this case, the LSI for system control has a resume feature which refers to resume information which was stored in the memory 54 when a previous playback had been performed, and then resumes the playback from the stopped point.

When judging that there exists resume information in the memory (if "YES" in step ST201), the LSI 5 for system control resumes the playback on the basis of the resume information, whereas when judging that there exists no resume information in the memory (if "NO" in step ST201) the LSI 5 for system control carries out a process of reading the TOC area of the optical disk 10 (step ST202). After the LSI 5 for system control then reads a track start point address and holds the track start point address in the memory 54 (step ST203), the LSI 5 for system control starts a playback operation (step ST204: at a start of the loop).

During playback of the optical disk, the LSI 5 for system control carries out a process of detecting a track start point position (step ST205). When detecting a track start point position (if "YES" in step ST205), the LSI 5 for system control subtracts the actual track start point address detected from the track start point address which is the contents information read from the TOC area of the optical disk 10, and calculates the difference between them (step ST206).

More specifically, in the LSI 5 for system control, during playback of the optical disk, the time information processing unit 53 detects an actual track start point address (a track number) by analyzing the subcode (time information) outputted from the LSI 2 for signal processing (the subcode extracting unit 22), and then outputs the actual track start point address to the comparison operation unit 52. The contents information read from the TOC area of the optical disk 10 is additionally inputted to the comparison operation unit 54, and the result of the comparison operation which is acquired by this comparison operation unit is held, as difference information (time difference information), as well as the track number, in the memory 54 (step ST207). The LSI for system control then goes round the above-mentioned playback loop until a playback stop request comes from outside the device and the disk control unit 51 receives the playback stop request (step ST209: at an end of the loop), and, when receiving the playback stop request, stops the playback operation (if "YES" in step ST208).

In FIG. 3, in the LSI 5 for system control, when the disk control unit 51 receives a search request which comes from outside the device, the time information processing unit 53 acquires the track start point address information from the memory 54 (step ST301), and further refers to the memory 54 so as to judge whether or not the difference information is stored in the memory (step ST302).

When the difference information corresponding to the track number is not held by the memory 54 (if "NO" in step ST302), the time information processing unit 53 sets, as the search target address, the track start point address, which has been acquired as mentioned above, to the disk control unit 51 (step ST306).

In contrast, when the difference information corresponding to the track number is held by the memory 54 (if "YES" in step ST302), the time information processing unit acquires the difference information from the memory 54 (step ST303), and corrects the track start point address on the basis of the difference information and sets, as the search target address, the corrected track start point address to the disk control unit 51 (step ST304).

The disk control unit 51 then performs the movement control of the optical pickup 1 on the basis of the search target address via the LSI 3 for servo control (the servo control unit 30).

According to above-mentioned Embodiment 1 of the present invention, when the LSI 5 for system control detects a track start point position during playback of the optical disk 10, the LSI 5 for system control can perform a track search correctly by comparing the contents information recorded in the optical disk 10 with the actual track start point position to calculate an error between them, and then making a correction at the time when performing the track search, and can also make the correction without affecting the playback.

Figure 4:
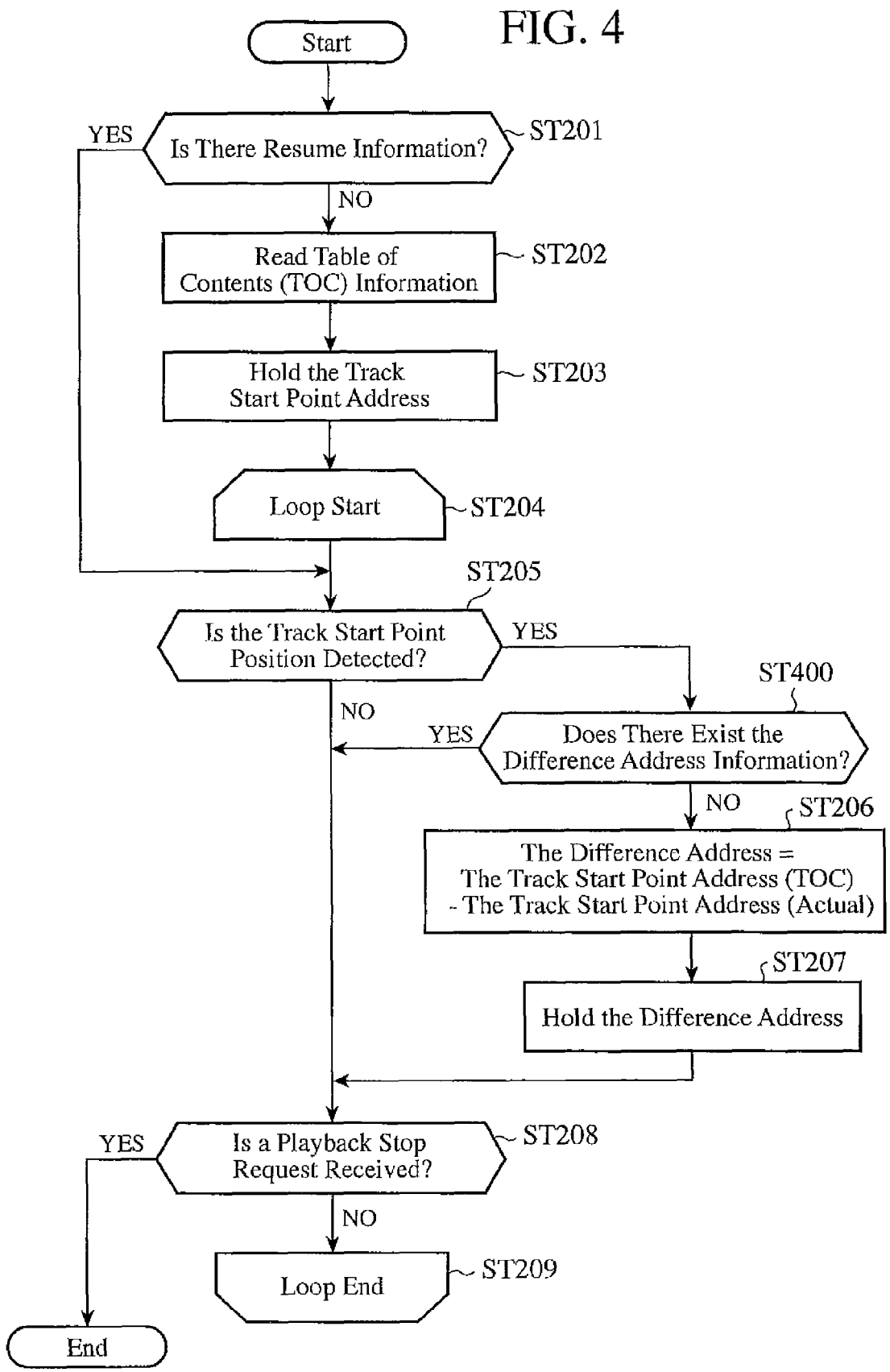
FIG. 4 is a flow chart which is referred to in order to explain the operation of an optical disk playback device in accordance with a variant of Embodiment 1 of the present invention.

FIG. 4 is a flow chart which is referred to in order to explain the operation of an optical disk playback device in accordance with a variant of Embodiment 1 of the present invention.

As shown in the flow chart of FIG. 4, the operation of the optical disk playback device in accordance with the variant differs from that of Embodiment 1 shown in FIG. 2 in that when detecting a track start point position, the LSI for system control judges whether or not the difference information exists in the memory before performing the comparison operation (step ST400) and omits the comparison operation process only when the difference information already exists, while the LSI for system control of Embodiment 1, as shown in the flow chart of FIG. 2, performs the comparison operation on the difference information every time when detecting a track start point position. Other processes of the variant are the same as those of Embodiment 1 shown in FIG. 2.

Therefore, the optical disk playback device in accordance with the above-mentioned variant of Embodiment 1 does not necessarily perform the comparison operation on the difference information every time when detecting a track start point position, the load on the LSI 5 for system control can be reduced compared with Embodiment 1, and therefore the processing speed can be improved.

Embodiment 2

Figure 5:
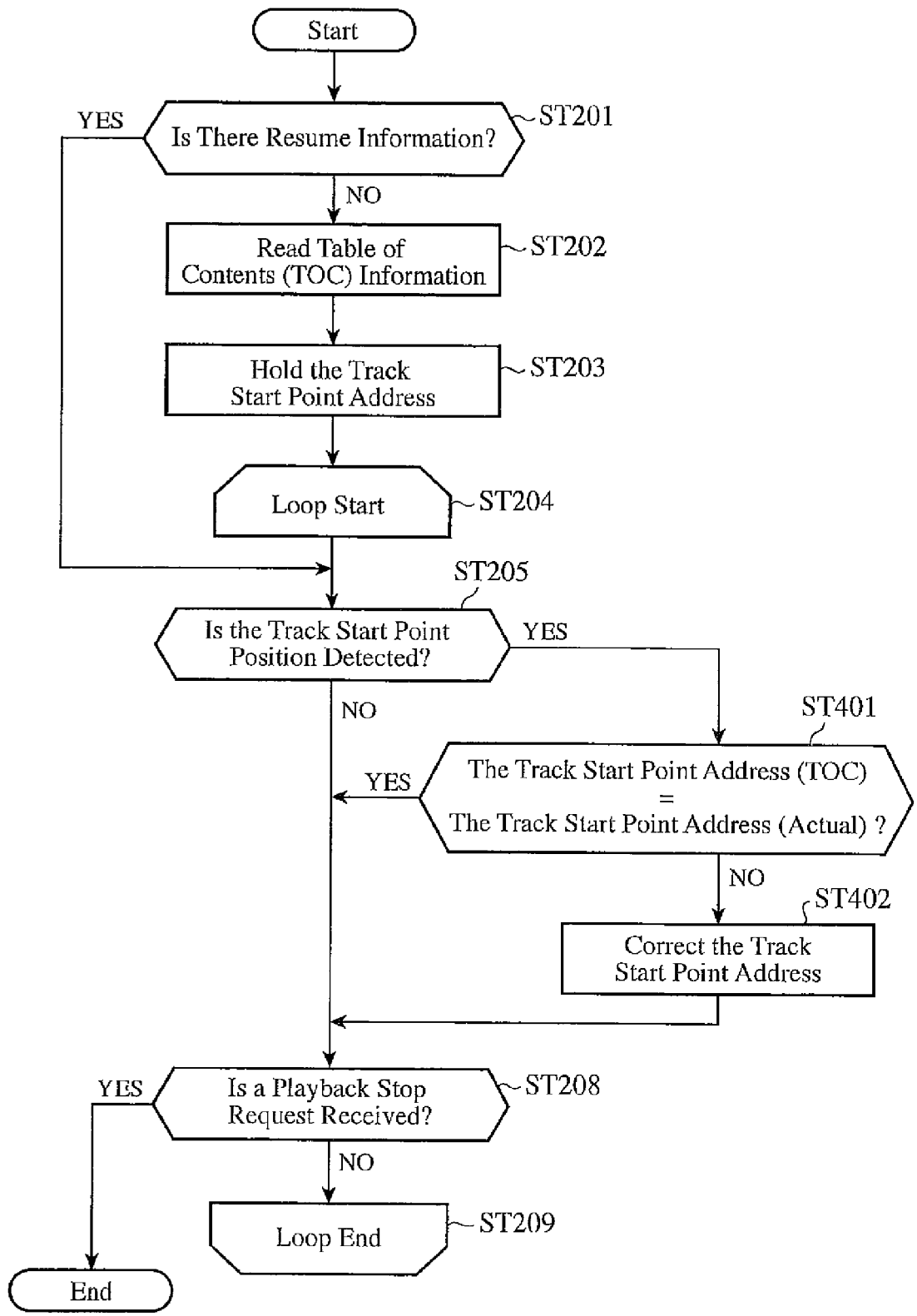
FIG. 5 is a flow chart which is referred to in order to explain the operation of an optical disk playback device in accordance with Embodiment 2 of the present invention.

FIG. 5 is a flow chart which is referred to in order to explain the operation of an optical disk playback device in accordance with Embodiment 2 of the present invention. It is assumed the optical disk playback device in accordance with Embodiment 2 uses the same structure as that of the optical disk playback device in accordance with Embodiment 1 shown in FIG. 1.

The optical disk playback device in accordance with Embodiment 2 shown in FIG. 5 differs from that of Embodiment 1 shown in FIG. 2 in that, while the optical disk playback device in accordance with Embodiment 1 holds the difference information in the memory 54, and, when performing a search, corrects the search target address, the optical disk playback device in accordance with Embodiment 2 corrects a track start point address (TOC information) on the basis of the difference information which the optical disk playback device generates by carrying out a comparison operation (steps STST401 and ST402), and, after that, replaces the track start point address with the corrected track start point address and performs a search without judging whether or not the difference information exists in the memory when a search request reaches. Other processes of the optical disk playback device are the same as those of Embodiment 1 shown in FIGS. 2 and 3.

According to above-mentioned Embodiment 2, after replacement of the TOC information is carried out, because this replaced TOC information is used and a track start point address is detected, the optical disk playback device can perform a track search correctly and can make a correction without affecting the playback.

Embodiment 3

Figure 6:
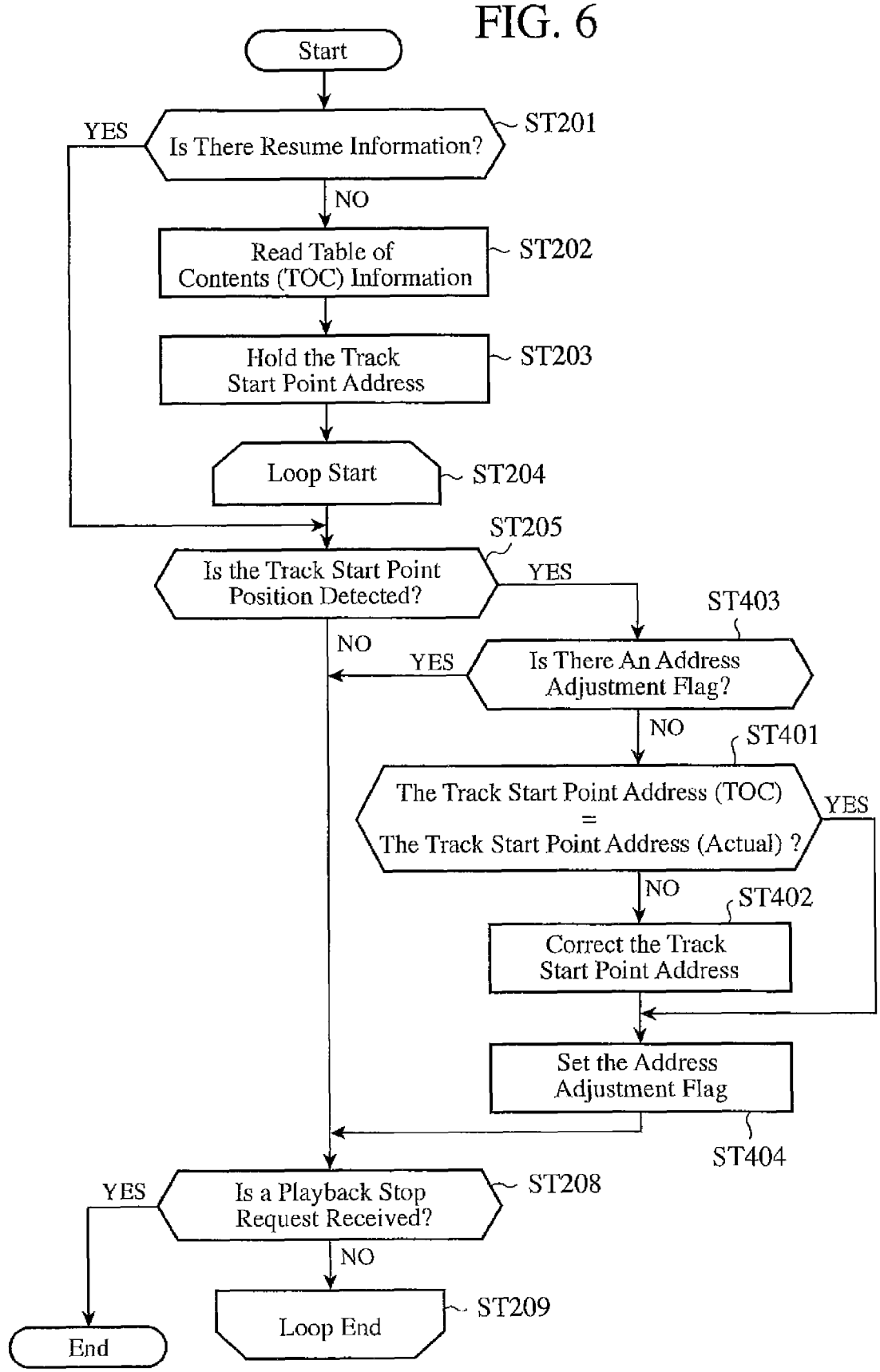
FIG. 6 is a flow chart which is referred to in order to explain the operation of an optical disk playback device in accordance with Embodiment 3 of the present invention.

FIG. 6 is a flow chart which is referred to in order to explain the operation of an optical disk playback device in accordance with Embodiment 3 of the present invention. It is assumed the optical disk playback device in accordance with Embodiment 3 basically uses the same structure as that of the optical disk playback device in accordance with Embodiment 1 shown in FIG. 1, as in the cases of Embodiments 1 and 2, though an address adjustment flag is assigned to and held by the memory 54.

The optical disk playback device in accordance with Embodiment 3 shown in FIG. 6 differs from that of Embodiment 2 shown in FIG. 5 in that, while the optical disk playback device in accordance with Embodiment 2 replaces TOC information with a corrected track start point address which has been acquired from difference information, the optical disk playback device in accordance with Embodiment 3 changes the value of an address adjustment flag which is disposed for and corresponds to each track, and then shows that the address is already updated, to omit the process of generating difference information even if detecting a track start point position.

More specifically, when detecting a track start point position (if "YES" in step ST205), the time information processing unit 53 of the LSI 5 for system control refers to the description of the address adjustment flag which is assigned to and stored in the memory 54 (step ST403).

At that time, when the address adjustment flag is in the OFF state (if "NO" in step ST205), the time information processing unit 53 judges whether or not the difference information exists in the memory (step ST401), and, when the difference information does not exist in the memory (if "NO" in step ST401), carries out a track start point address correcting process (step ST402) and then sets the address adjustment flag (step ST404), whereas when the difference information exists in the memory (if "YES" in step ST401), the time information processing unit carries out the process of setting the address adjustment flag (step ST404).

The optical disk playback device in accordance with above-mentioned Embodiment 3 shows that the TOC information is replaced by the track start point address which is corrected with the difference information by changing the value of the address adjustment flag which corresponds to each track and is disposed for each track, and, after that, can omit the process of generating difference information when detecting a track start point position. Therefore, every time when detecting a track start point address, the optical disk playback device does not have to replace the TOC information with the corrected track start point address, and the optical disk playback device has only to refer to the description of the address adjustment flag. As a result, compared with Embodiment 2, the load on the LSI 5 for system control can be reduced, and the processing speed can be improved.

Furthermore, the optical disk playback device in accordance with Embodiment 3 can also perform a track search correctly, and can also correct the target track position without affecting the playback.

The optical disk playback device in accordance with any of above-mentioned Embodiment 1 to Embodiment 3 performs the comparison operation on the difference information when detecting a track start point position during playback of the optical disk. As an alternative, the optical disk playback device can perform the comparison operation on the difference information when detecting a track start point position in performing a search, and the same advantages can be provided in this case.

The LSI 5 for system control shown in FIG. 1 consists of, for example, a microcomputer, and serially reads a program recorded in an internal memory, and executes the program to control the peripheral LSIs, so as to perform the functions of the control means for holding difference information which the control means generates by, during playback of the optical disk 10, performing a comparison between track start point position information detected and track start point position information acquired with reference to the contents information, and for, when performing a track search, correcting the track start point position information on the basis of the held difference information. The peripheral LSIs mentioned here refer to the LSI 2 for signal processing, the LSI 3 for servo control, and the LSI 4 for playback control.

INDUSTRIAL APPLICABILITY

As mentioned above, the optical disk playback device in accordance with the present invention calculates and holds an error between the contents information of an optical disk, and an actual track start point position. Therefore, the optical disk playback device in accordance with the present invention is suitable for use in reading of the contents information recorded in a TOC (Table Of Contents) area of an optical disk, such as a CD-ROM, a CD-R, or a CD-RW, and reading and a playback of information, such as music or an image, recorded in the program area of the optical disk on the basis of the contents information.

The invention claimed is:

1. An optical disk playback device comprising:
a first control means for detecting a track start point position, and for holding, as well as a track number of the detected track start point position, difference information which said first control means generates by, during playback of an optical disk, performing a comparison between track start point position information detected and track start point position information acquired with reference to contents information recorded in said optical disk; and
a second control means for, when receiving a search request from outside said device, if said difference information to said track number is held, correcting said track start point position information on a basis of said difference information,
wherein when detecting the track start point position, the first control means judges whether or not difference information of the detected track start point exists and, when the difference information already exists, omits a comparison with regard to the detected track start point position.

2. The optical disk playback device according to claim 1, wherein said second control means updates said contents information by using said difference information, and performs a subsequent track search on a basis of said updated contents information.

3. The optical disk playback device according to claim 2, wherein said second control means has a flag indicating whether or not said contents information has been updated, and, when, after said track start point position is detected, said flag is referred to and indicates that said contents information has been updated, omits the process of updating said contents information.

4. An optical disk playback device comprising:
an optical pickup means for reading information recorded in an optical disk and for outputting a signal according to said information;
a signal processing means for decoding said signal to output the decoded signal to a playback system, and for extracting a subcode from said signal to output time information;
a control means for detecting a track start point position, and for holding, as well as a track number of the detected track start point position, time difference information which said control means generates by, during playback of an optical disk, performing a comparison between track start point position information analyzed with said subcode and track start point position information acquired with reference to contents information recorded in said optical disk, and for correcting said track start point position information, if said time difference information to said track number is held, on a basis of said time difference information when performing a track search; and
a servo control means for carrying out movement control of said optical pickup means on a basis of said corrected track start point position information,
wherein when detecting the track start point position information analyzed with said subcode, the control means judges whether or not time different information of the detected track start point position information exists and, when the time difference information already exists, omits a comparison with regard to the detected track start point position information.

* * * * *